Figure 1:
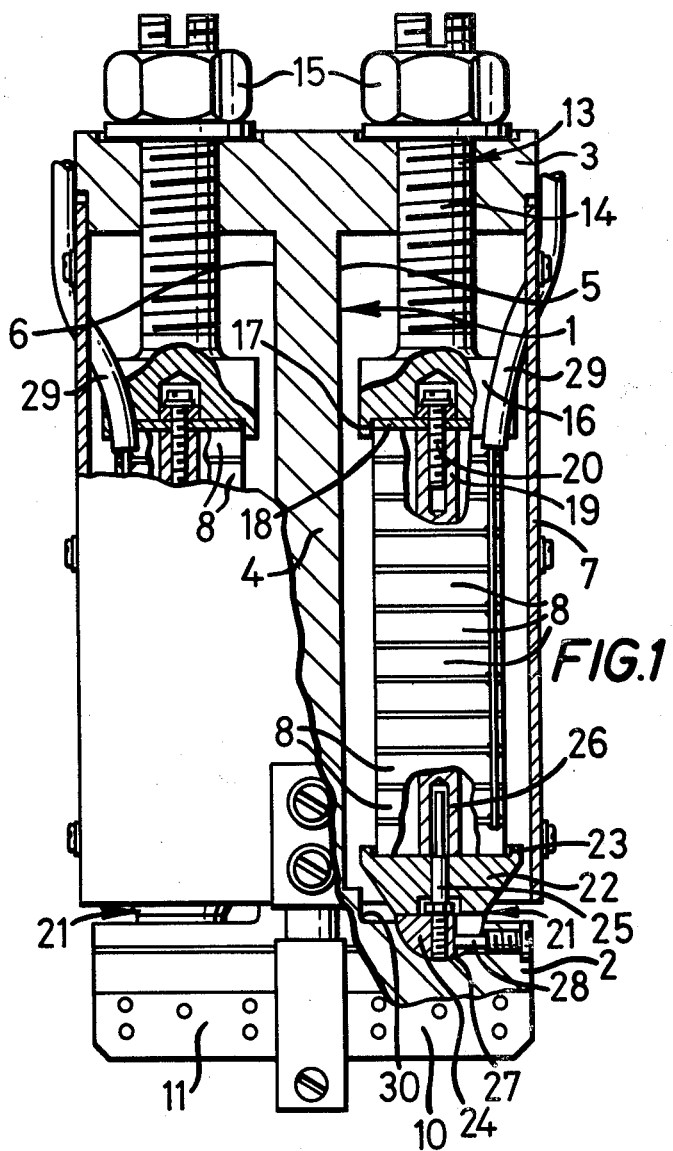

United States Patent [19]

Hensel

[11] 4,319,902
[45] Mar. 16, 1982

[54] JOINING OPTICAL FIBER END PARTS

[75] Inventor: Paul C. Hensel, Suffolk, England

[73] Assignee: The Post Office, London, England

[21] Appl. No.: 145,384

[22] Filed: Apr. 30, 1980

[30] Foreign Application Priority Data

May 1, 1979 [GB] United Kingdom ............... 15133/79

[51] Int. Cl.³ .............................................. C03B 23/20
[52] U.S. Cl. ....................................... 65/4.21; 65/152; 219/57; 350/96.21
[58] Field of Search ................. 65/4 R, 4 A, 4 B, 152, 65/4.21; 219/57; 350/96.21; 156/158

[56] References Cited

U.S. PATENT DOCUMENTS

| | | | |
|---|---|---|---|
| 2,756,308 | 7/1956 | Powell | 219/57 |
| 3,384,731 | 5/1968 | Draving | 219/57 |
| 3,394,241 | 7/1968 | Sparrow et al. | 219/57 X |
| 3,893,837 | 7/1975 | Gasbarro | 65/152 X |
| 3,960,531 | 6/1976 | Kohanzadeh et al. | 65/4 B |
| 4,049,414 | 9/1977 | Smith | 65/4 B |
| 4,118,618 | 10/1978 | Gauthier et al. | 65/152X |

OTHER PUBLICATIONS

Bisbee, "Splicing Silica Fibers With an Electric Arc", Applied Optics, vol. 15, No. 3, Mar. 1976, pp. 796–798.

*Primary Examiner*—Richard V. Fisher
*Attorney, Agent, or Firm*—Kemon & Estabrook

[57] ABSTRACT

Optical fibers are welded together by positioning the end parts in vacuum chucks 10 and 11. Piezo-electric elements 8 force the chucks towards one another. The piezo-electric elements are put into operation by the power supply of a welding arc operating between the chucks. The heated fiber end parts are thus moved together to ensure a good welded joint.

8 Claims, 3 Drawing Figures

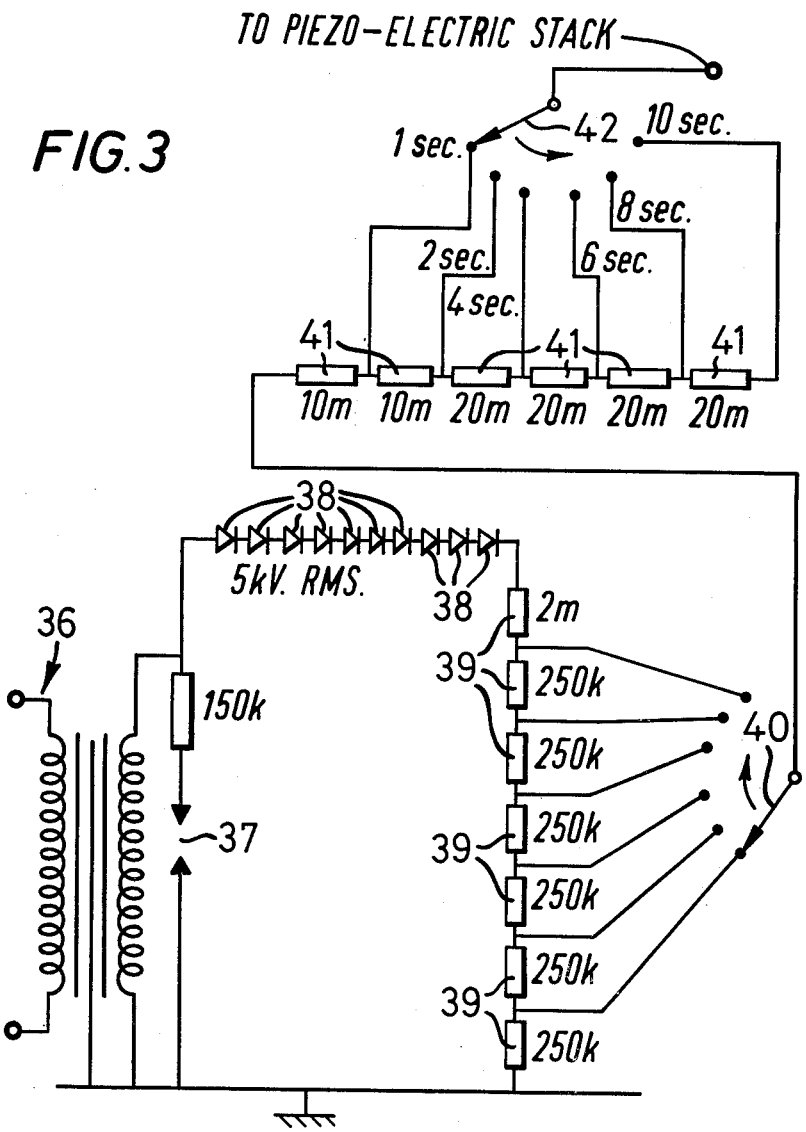

JOINING OPTICAL FIBER END PARTS

This invention relates to the joining in end-to-end aligned relationship of elongate dielectric optical waveguides usually of silica or glass. These waveguides being fibrous in physical form are conventionally referred to as optical fibres.

It has been proposed to join optical fibres by a welding technique which involves placing the fibre end parts together in aligned abutting relationship and striking an electrical arc impinging on the fibre end parts to effect a fusion joint or splice hereinafter referred to as a weld. In order to achieve a satisfactory weld it has been found necessary to move the fibre end parts together a small distance, of the order of 10–20 microns, whilst they are being heated to the melted state. It is an objective of the invention to provide a simple means for effecting this movement.

In accordance with one aspect of the present invention a method of joining together optical fibres in aligned end-to-end relationship comprises the steps of positioning the end parts of the fibres in end-to-end, usually abutting relationship, heating the fibre end parts by electrical means, and moving the heated fibre end parts towards one another by means put into operation by the initiation of the supply of electrical current to the electrical heating means.

Apparatus in accordance with the present invention for carrying out this method comprises support elements for supporting the fibre end parts in aligned, usually abutting relationships, electrically powered heating means for heating the fibre end parts to a welding temperature and actuating means responsive to the initiation of the supply of electrical current to the heating means for moving at least one of the support elements and the heated fibre end part supported thereby towards the other heated fibre end part.

In accordance with a preferred feature of the invention, the actuating means comprises a piezo-electric transducer connected to a high voltage power supply for generating a welding arc impinging on the fibre end parts. When the power supply is energised, the fibre end parts are heated whilst the actuating means moves the fibre end parts together. Means are preferably provided for adjusting the total movement of the fibre end parts and the time taken to achieve this movement.

Figure 2:
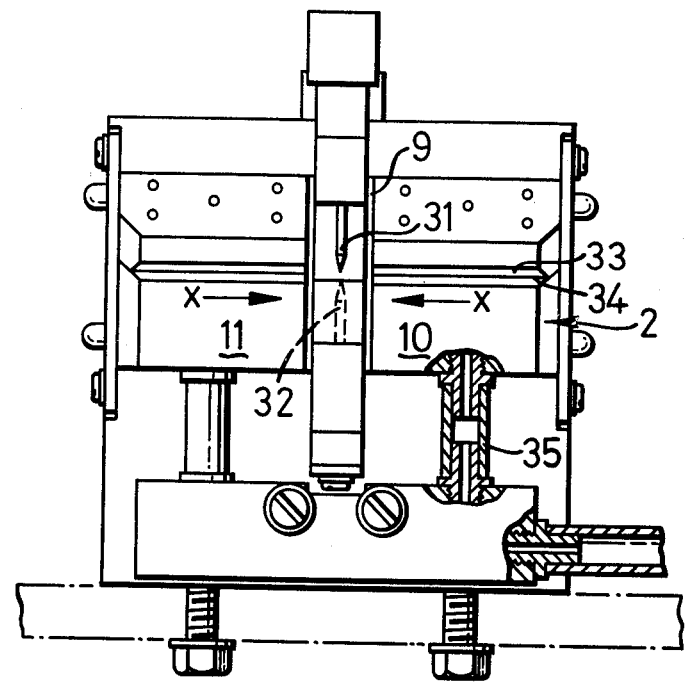

A particular embodiment of the invention will now be described by way of example and with reference to the accompanying drawings wherein:

FIG. 1 is a plan view partly in section;
FIG. 2 is a side view also partly in section, and
FIG. 3 is an electrical circuit diagram of a power supply to a welding device and the piezo-electric actuating device.

The apparatus shown in the drawings comprises a generally I-shaped massive body member 1 with inner and outer cross members 2 and 3. A connecting web 4 divides the body 1 into two shallow channel shaped recesses 5 and 6. A casing 7 covers the recesses and the operating parts contained therein. The inner surface of the inner cross member 2 has, as can be seen in FIG. 2 a part circular recess 9 dividing the cross member into chucks 10 and 11.

Each recess 5, 6 houses a stack of piezo-electric discs 8 and associated energising and actuating parts. Thus a massive support element 13 has a stem 14 threadably engaged with the outer cross member 3 and locked by a nut 15. At the inner end of the stem 14 a seating head 16 has a circular recess 17 which receives a clamping washer 18 and the outer piezo-electric disc 8. The discs 8 are threaded onto a rod 19 which is secured to clamping washer 18 by bolt 20.

A pressure pad 21 driven by the stack of rings 8 has a conical outer part 21 with a recess 23 to receive the front piezo-electric ring 8 and a hemispherical inner end part 24. A pin 25 threadably engaged with part 24 is slidable in a socket 26 in the inner end surface of rod 19. The hemispherical part 24 is received in a correspondingly shaped recess 27 in the inner cross member 2 and is secured thereto by pin 28 screwed into the cross-member.

The arrangement is such that when a voltage is applied to the piezo-electric elements 8 through electrical connections indicated at 29 each stack of elements 8 effectively lengthens and pressure pads 21 are moved in a direction against the rear of the cross member 2. Thus each chuck 10 and 11 is pushed forwardly and pivots inwardly about a point 30. This inward movement is indicated by arrows x in FIG. 2. It will be appreciated that this movement is accommodated by recess 9.

The welding arrangements are also illustrated in FIG. 2 and comprises welding electrodes 31 and 32 bare and buried respectively. The arc between electrodes 31 and 32 is developed transversely of the movement x.

In each chuck 10, 11 there is provided a V-shaped notch 33 with a narrow slit 34 at the apex thereof. The slit is connected through pipes 35 to a source of suction so that an optical fibre located in the apex is retained therein. This location may be enhanced by mechanical clamping means. The chucks 10 and 11 with these locating means may be referred to as vacuum chucks.

Referring now to FIG. 3 the power supply circuit diagrammatically illustrated therein comprises a timed source 36 of AC current at 5 kv for generating the welding arc at 37. A tapping across the welding arc comprises a plurality of rectifying diodes 38 and a plurality of resistances 39 across which a voltage can be selectively tapped by a switch 40. The tapping selected determines the ultimate voltage delivered to the piezo-electric stack, the movement of said stack and hence ultimately the travel of the chucks 10 and 11. A series connection of resistances 41 beyond the tapping which again can be selectively chosen by a switch mechanism diagrammatically illustrated at 42, determines the current applied to the stack and hence the speed at which the stack comes to its ultimate travel. The timing device for the welding arc is such that the duration of the welding arc is always greater than the total time it takes for the stack to perform its ultimate travel and hence the time it takes for the chucks 10, 11 to perform their full stroke.

A suitable material for the piezo-electric discs 8 is the ceramic material based on Lead, Zirconium and Titanium sold by the Company Vernitron under the Trade Mark "PZT 5H" and 12 discs of this material provide a movement of 15 microns when subjected to 3 kv.

In use, fibre end parts are located in grooves 33 by the suction exerted through pipes 35. The end of the fibre in chuck 10 is placed in light contact, i.e. substantially without pressure, with that in chuck 11 and the welding arc struck. The chucks move the melting fibre end parts together. The movement of the fibre end parts is not strictly linear, but for the very small distance involved this is not significant. The amount of movement appropriate to the weld and the time for carrying out this movement can be determined by the resistances selected by switches 40 and 42. The values of the resistances 39 and 41 are identified in FIG. 3 as are the times referred to above appropriate to the particular value of resistance 41.

It will be appreciated that a single movable chuck 10, 11 with its actuating stack of piezo-electric elements 8 can effect welding by moving a heated fibre end part against a static heated fibre end part.

I claim:

1. A method of welding two optical fibres in aligned end-to-end relationship, comprising the steps of:
    positioning the fibre end parts into abutting relationship;
    initiating an electrical current to strike a welding arc to heat both fibre end parts to a melting temperature; and
    transducing said electrical current into movement of the fibre ends into one another for a predetermined distance.

2. Welding apparatus for joining optical fibers in aligned end-to-end relationship, comprising:
    support elements for supporting the fiber end parts in axially aligned relationship;
    electrically powered heating means for heating the fiber end parts to a welding temperature; and
    a piezo-electric transducer connected to the power supply for said heating means and responsive to the initiation of the supply of electrical current to said heating means for moving at least one of said support elements and the heated fiber and part supported thereby towards the other heated fiber end part.

3. Apparatus as claimed in claim 2 wherein said electrically powered heating means comprises a high voltage power supply for generating a welding arc impinging on the fibre end parts.

4. Apparatus as claimed in claim 3 wherein means are provided for adjusting the amount of movement of the fibre end parts and the time taken to carry out this movement.

5. Apparatus as claimed in claim 4 wherein the transducer comprises at least one stack of piezo-electric elements (8) rigidly mounted at one end and at the other end acting against a chuck (10, 11) holding a fibre end part.

6. Apparatus as claimed in claim 5 comprising a body member (1) with cross members (2) and (3) defining a recess (5) in which the stack is received, expansion of the stack causing one of the cross members which constitutes a chuck (10, 11) holding a fibre end part to flex thereby providing the welding movement.

7. Apparatus as claimed in claim 5 wherein the chuck (10, 11) comprises a groove (32) in which the fibre is located, vacuum means being provided to locate the fibre in the groove.

8. Apparatus as claimed in claim 6 wherein the body member is I-shaped with inner and outer cross members (2) and (3) and two recesses (5) each housing a stack of piezo-electric elements (8) and wherein the inner cross member has a recess (9) defining two chucks (10) and (11) and allowing flexing.

* * * * *